US012626879B2

(12) United States Patent
Urech et al.

(10) Patent No.: US 12,626,879 B2
(45) Date of Patent: May 12, 2026

(54) CIRCUIT BREAKER TRIPPING MECHANISM

(71) Applicant: Rockwell Automation Switzerland GmbH, Aarau (CH)

(72) Inventors: David J. Urech, Mellingen (CH); Sadashiv Pimple, Zuchwil (CH); Rahel J. von Arx, Schinznach-Dorf (CH)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 286 days.

(21) Appl. No.: 18/505,989

(22) Filed: Nov. 9, 2023

(65) Prior Publication Data

US 2025/0157772 A1 May 15, 2025

(51) Int. Cl.
*H01H 71/52* (2006.01)
*H01H 71/24* (2006.01)
*H01H 71/50* (2006.01)

(52) U.S. Cl.
CPC ...... *H01H 71/521* (2013.01); *H01H 71/2472* (2013.01); *H01H 71/505* (2013.01)

(58) Field of Classification Search
CPC ...... H01H 71/00; H01H 71/52; H01H 71/521; H01H 71/2472; H01H 71/50; H01H 71/505; H01H 71/10; H01H 71/1009; H01H 71/127; H01H 71/14; H01H 71/24; H01H 3/00; H01H 3/02; H01H 3/32; H01H 3/46; H01H 3/54; H01H 9/20; H01H 37/60
USPC .......................................................... 200/401
See application file for complete search history.

(56) References Cited

U.S. PATENT DOCUMENTS

| | | | | |
|---|---|---|---|---|
| 2,795,670 | A | 6/1957 | Cellerini et al. | |
| 2,813,167 | A | 11/1957 | Bingenheimer et al. | |
| 3,665,360 | A | 5/1972 | Norden | |
| 7,570,146 | B2 | 8/2009 | Mills et al. | |
| 9,711,307 | B2 | 7/2017 | Weiden | |
| 11,031,191 | B2 * | 6/2021 | Pinero | H01H 3/3021 |
| 2009/0128077 | A1 | 5/2009 | Kawata et al. | |
| 2020/0027678 | A1 | 1/2020 | Gibson | |
| 2025/0118516 | A1 | 4/2025 | Cho | |
| 2025/0157772 | A1 | 5/2025 | Urech | |

FOREIGN PATENT DOCUMENTS

| | | | |
|---|---|---|---|
| DE | 102008020453 | A1 | 10/2008 |
| IT | 1101591 | B | 10/1985 |
| JP | 2002298723 | A | 10/2002 |

OTHER PUBLICATIONS

Ex Parte Quayle action issued by the USPTO in U.S. Appl. No. 18/505,967 on Oct. 2, 2025, 21 pages.

* cited by examiner

*Primary Examiner* — Anthony R Jimenez

(57) ABSTRACT

Embodiments of the present technology include a circuit breaker with a tripping mechanism. The tripping mechanism includes a latch and a latch lever, according to some embodiments. The latch lever may be coupled to a toggle via a joint arm in some embodiments. The latch lever may also be coupled to a change lever via a buckled shackle. In some embodiments, the buckled shackle includes a first section, a second section, and a bend between the first section and the second section.

20 Claims, 13 Drawing Sheets

CIRCUIT BREAKER TRIPPING MECHANISM

INCORPORATIONS

The following U.S. Patent Applications, each of which are filed concurrently with the present application, are incorporated by reference herein in their entireties for all purposes: Ser. No. 18/505,948, titled "CIRCUIT BREAKER INTERLOCK MECHANISM," Ser. No. 18/505,967, titled "CIRCUIT BREAKER LINEAR LEVER AND TRIPPING FORK MECHANISM," and Ser. No. 18/506,006, titled "CIRCUIT BREAKER COMPENSATION BIMETAL OF A THERMAL TRIPPING MECHANISM." Each of the applications describe features of a circuit breaker, all of which can be incorporated into a single circuit breaker to obtain the benefit of each of the described features.

TECHNICAL FIELD

Various embodiments of the present technology generally relate to tripping mechanisms in circuit breakers. More specifically, a tripping mechanism is disclosed that reduces the force needed to cause a trip related to a short circuit or over-current condition while avoiding trips related to physical shocks often experienced in industrial automation environments.

BACKGROUND

Circuit breakers are electrical switching devices designed to protect electrical circuits from potential damage that can be caused by short circuits or overloads. Circuit breakers may be implemented in industrial environments as components of electrical circuits. When a circuit breaker is turned on, an electrical connection is created by bringing sets of metal contacts into contact with one another to allow the flow of current through the circuit. When the device is turned off, the metal contacts are separated to interrupt the flow of current in the circuit. Circuit breakers may be manually or automatically operated to switch the device between states. Certain challenges have been faced with respect to achieving the appropriate sensitivity of circuit breakers in response to short circuits and overloads.

It is with respect to this general technical environment that aspects of the present disclosure have been contemplated. Furthermore, although a general environment is discussed, it should be understood that the described examples should not be limited to the general environment identified in the background.

SUMMARY

This Overview is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Various embodiments of this disclosure relate to the mechanics used to stop current flow in a circuit breaker due to a short circuit or over-current condition. The mechanical components include a complex series of components that push a latch when an over-current or short circuit occurs. The latch holds a latch lever in an on position when the circuit breaker is on. Movement of the latch releases the latch lever, and the release of the latch lever causes a series of mechanical movements that separate the contacts of the circuit breaker to halt current flow. The point of contact between the latch and the latch lever sets the sensitivity of the circuit breaker to experiencing a trip. Accordingly, trips can occur due to short circuits and over-current based on the mechanical components of the circuit breaker that are designed to move the latch based on the relevant condition. Further, physical shocks (e.g., drops, bumps, and other physically jarring events) to the circuit breaker can cause a trip to occur if the sensitivity of the circuit breaker is too low. However, setting the sensitivity of the circuit breaker too high by requiring a large force to release the latch lever may make the circuit breaker insensitive to small movements of the components used to trip the circuit breaker based on short circuit and over-current conditions. To combat this potential issue, the described latch, latch lever, buckled shackle, and other movement components of the tripping mechanism are designed to reduce the force needed to trip the circuit breaker due to a short circuit or over-current condition while not creating over-sensitivity to physical jarring of the circuit breaker due to dropping, bumps, and other movement experienced in an industrial automation environment.

Some embodiments of the present disclosure include a tripping mechanism including a latch. The latch includes a pivoting body, a first extension disposed on the pivoting body at a first location, the first extension including a latch contact surface, and a second extension disposed on the pivoting body at a second location, the second extension including a trip component contact surface, wherein movement of a trip component in contact with the trip component contact surface causes the pivoting body to pivot about a first axis from a first position to a second position. Some embodiments include a latch lever include: a first end, a second end, and a bend disposed between the first end and the second end, a first rotational joint disposed at the bend and a second rotational joint disposed at the first end and spaced apart from the first rotational joint, a latch lever contact surface disposed at the second end, wherein the latch lever moves between an on position and a trip position, wherein movement of the latch to the second position causes the latch lever to move from the on position to the trip position. Some embodiments include a buckled shackle including a first section including a first end coupled to the second rotational joint, a second section including a second end coupled to a change lever, wherein the second section is integral with the first section, and a bend having an oblique angle between the first section and the second section, wherein the oblique angle is selected such that a force exerted by the latch lever contact surface on the latch contact surface falls within a sensitivity range when the latch lever is in the on position and the latch is in the first position.

Some embodiments include a joint arm having a first end and a second end, the first end being rotatably coupled to the first rotational joint and the second end being coupled to a toggle, wherein the toggle is operably coupled to a switch.

In some embodiments the buckled shackle bends around the first rotational joint when the latch lever is in the on position such that at least a portion of the first rotational joint is located between the first end and the second end of the buckled shackle.

In some embodiments in the change lever includes a fixed rotational joint, and wherein the change lever is coupled to a coiled spring that applies a force on the change lever when the latch lever is in the on position.

In some embodiments the sensitivity range is between 6 Newtons and 8 Newtons.

In some embodiments the oblique angle between the first section and the second of the buckled shackle is between 150 degrees and 170 degrees.

In some embodiments a tripping force exerted by the trip component contact surface on the first extension of the latch needed to move the latch from the first position to the second position is approximately 1.4 Newtons.

In some embodiments the trip component contact surface of the second extension of the latch is a thermal trip component contact surface, and wherein the latch further comprises a third extension disposed on the pivoting body at a third location, the third extension including a magnetic trip component contact surface, wherein movement of a magnetic trip component in contact with the magnetic component contact surface causes the pivoting body to pivot about the first axis from the first position to the second position.

Some embodiments include a third rotational joint disposed in the change lever, wherein the second end of the buckled shackle is rotatably coupled to the third rotational joint, and wherein a line from a rotational center of the second rotational joint to a rotational center of the third rotational joint is aligned with the first rotational joint in a direction perpendicular to a rotational plane of the first rotational joint when the latch lever is in the on position.

In some embodiments, when the latch lever is in the on position, no portion of the buckled shackle is aligned with the first rotational joint in a direction perpendicular to the rotational plane of the first rotational joint.

Some embodiments include a circuit breaker including: a stationary contact disposed in a circuit, a moving contact that moves between a first position in which the moving contact physically contacts the stationary contact and a second position in which the moving contact is separated from the stationary contact. Some embodiments include a switch selectable between an ON state in which the moving contact physically contacts the stationary contact and an OFF state in which the moving contact is separated from the stationary contact. Some embodiments include a rotary disk coupled to the switch and a tripping mechanism coupled to the rotary disk. In some embodiments the tripping mechanism includes a latch including a first extension having a latch contact surface and a second extension that receives a mechanical indication of a trip condition in the circuit breaker, wherein the latch moves in response to the mechanical indication to initiate a trip response. In some embodiments the tripping mechanism includes a latch lever including a first rotational joint, a second rotational joint spaced apart from the first rotational joint, and a latch lever contact surface that applies a force against the latch contact surface of the latch when the switch is in the ON state and the moving contact is in the first position. In some embodiments the tripping mechanism includes a buckled shackle including: a first section including a first end coupled to the second rotational joint, a second section including a second end coupled to a change lever, wherein the second section is integral with the first section, and a bend having an oblique angle between the first section and the second section, wherein the oblique angle is selected such that a force exerted by the latch lever contact surface on the latch contact surface falls within a sensitivity range when the latch lever is in the on position and the latch is in the first position.

These and other features and aspects of various examples may be understood in view of the following detailed discussion and accompanying drawings.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

This disclosure relates to circuit breakers having a trip mechanism. Embodiments disclosed include a latch that may initiate a trip (e.g., a thermal trip or a magnetic trip). When the circuit breaker is on (i.e., allowing current flow), a contact surface on a latch lever applies a force against a contact surface of the latch, holding the latch lever in an ON position. A trip is initiated when the latch rotates and the contact surface of the latch no longer physically touches the contact surface of the latch lever. The latch lever may have a first rotational joint in which a joint arm is coupled to a toggle allowing an operator to turn the circuit breaker on and off. The latch lever is also coupled to a change lever via a buckled shackle, where the change lever pushes down on a rocker extension to open the circuit when the circuit breaker is OFF or in response to a tripping event (e.g., short circuit or over-current). A coiled spring applies a downward force on the change lever in the ON configuration. The buckled shackle in turn applies a force on a second rotational joint of the latch lever in the ON configuration.

The buckled shackle may have a bend to reduce the moment arm of the force the buckled shackle applies on the latch lever. The reduction in the moment-arm results in a reduced force between the latch and latch lever when the circuit breaker is on. As a result, lower tripping forces on the latch are required to initiate a trip, which allows for a greater sensitivity of response to short circuit and over-current conditions in the circuit. The configuration and design also reduces the internal forces of components in the tripping mechanism, which results in cost savings with respect to the materials and design of the components. Additionally, the bend in the buckled shackle allows the buckled shackle to avoid undesired contact between the buckled shackle and other components during a trip.

Figure 1:
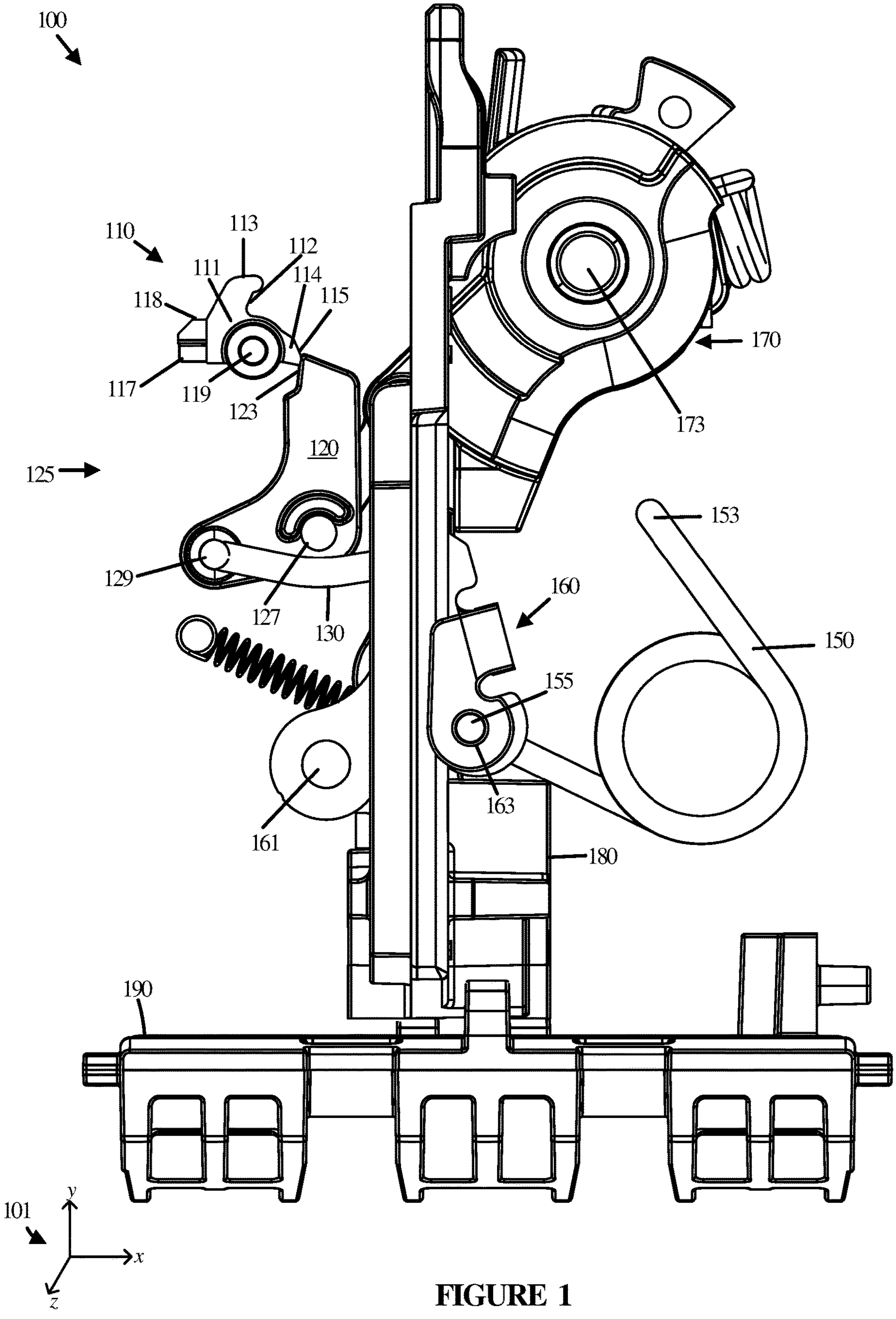
FIG. 1 shows a circuit breaker, according to some embodiments.

Referring now to the figures, FIG. 1 illustrates a circuit breaker 100 according to some embodiments. The circuit breaker 100 may be any type of circuit breaker including, for example, a thermal-magnetic circuit breaker. The circuit breaker 100 includes a tripping mechanism 125 which operates to open and close a circuit to allow or stop current flow through the circuit breaker 100. In some embodiments the tripping mechanism 125 includes a latch 110, a latch lever 120, and a buckled shackle 130. The tripping mechanism 125 has three general configurations: an ON configuration, an OFF configuration, and a TRIP configuration. While FIG. 1 portrays the ON configuration, each configuration is discussed in relation to FIGS. 2A-2C below.

The latch 110 as shown in FIG. 1 may include a pivoting body 111, a first extension 114 extending from the pivoting body 111, a second extension 113 extending from the pivoting body 111, and a third extension 117 extending from the pivoting body 111. The pivoting body 111 is rotatable about a rotational joint 119. Specifically counterclockwise rotation of the pivoting body 111 (in the view in FIG. 1) about the rotational joint 119 initiates a trip of the circuit breaker 100 when the tripping mechanism 125 is in the ON configuration. The latch 110 in FIG. 1 is shown in a first position. A trip may be initiated when the latch 110 rotates in a counterclockwise direction (in the view of FIG. 1) to a second position. The initiation of a trip is discussed in greater detail below.

The first extension 114 includes a latch contact surface 115. The latch contact surface 115 of the first extension 114 is in contact with the latch lever contact surface 123 when the circuit breaker 100 is in the ON configuration, as discussed in greater detail below. The second extension 113 includes a trip component contact surface 112, which is a thermal trip component contact surface in some embodiments. Movement of a thermal trip component in contact with the thermal trip component contact surface 112 causes the latch 110 to rotate counterclockwise (in FIG. 1) and initiate a trip. The third extension 117 includes a trip component contact surface 118, which is a magnetic trip component contact surface in some embodiments. Movement of a magnetic trip component in contact with the thermal trip component contact surface 118 causes the latch 110 to rotate counterclockwise (in FIG. 1) and initiate a trip.

With reference to the coordinate system 101, the latch 110 rotates in the x-y plane with a rotational axis in the z direction. In some embodiments, the latch 110 is plastic. In other embodiments the latch 110 may be another material such as metal, composite material, or any combination of these materials.

The latch lever 120 may include a first rotational joint 127, a second rotational joint 129, and a contact surface 123. The axis of rotation of the first rotational joint 127 may be in the z direction, with the axis of rotation of the second rotational joint 129 also being in the z direction. The contact surface 123 of the latch lever 120 is in contact with the latch contact surface 115 when the trip mechanism is in the ON configuration shown in FIG. 1. In the ON configuration, the latch lever contact surface 123 applies force against the latch contact surface 115, as discussed in greater detail below. In some embodiments the latch lever 120 is plastic. In other embodiments the latch lever 120 may be another material such as metal, composite material, or any combination of these materials.

The buckled shackle 130 couples the latch lever 120 with the change lever 160 in a manner discussed in greater detail below. The latch lever 120 is also coupled to the toggle 170 via a joint arm 171 (see FIG. 5). The tripping mechanism 125 also includes a coiled spring 150. The first end 153 of the coiled spring 150 may be fixed such that it does not move when other components of the circuit breaker move. The second end 155 of the coiled spring 150 may be disposed in a third rotational joint 163 of the change lever 160. The change lever 160 also includes a fixed rotational joint 161 about which the change lever 160 rotates.

The change lever 160 pushes on the rocker arm 180 when switching from the ON configuration to the TRIP or OFF configurations. The change lever 160 thus translates the movement of the latch lever to a movement of the rocker arm 180 downward in the −y direction. The rocker arm 180 is in turn coupled to the rocker 190. Downward movement of the rocker arm 180 causes the rocker 190 to rotate, pushing down (in the −y direction) on the components holding conductive contacts together, which separates the conductive contacts to open the circuit, stopping the current flow. The operation of the rocker 190 is discussed in greater detail in relation to FIG. 7 below.

When the circuit breaker 100 is in the ON configuration (as shown in FIG. 1) the coiled spring 150 is loaded to exert a downward force (in the −y direction) on the change lever 160. Specifically, the second end 155 of the coiled spring 150 exerts a force in the −y direction on the change lever 160. The buckled shackle 130 is also coupled to the change lever 160 to hold the change lever 160 in place in the ON configuration. Although the coupling between the buckled shackle 130 and the change lever 160 is not visible in FIG. 1, it is shown with greater clarity in FIGS. 3 and 4.

While one end of the buckled shackle 130 is coupled to the change lever 160, the other end of the buckled shackle 130 is coupled to the second rotational joint 129 of the latch lever 120. The force of the buckled shackle 130 on the latch lever 120 causes the latch lever 120 to exert a force against the latch 110. Specifically, the contact surface 123 of the latch lever 120 exerts a force against the contact surface 115 of the latch 110. The force between the latch contact surface 115 and the latch lever contact surface 123 is thus loaded, at least in part, by the coiled spring 150 via the change lever 160 and the buckled shackle 130. The buckled shackle 130 has a bent shape in some embodiments. The bent shape of the buckled shackle 130 allows for a reduction of the force between the latch contact surface 115 and the latch lever contact surface 123 when the tripping mechanism 125 is in the ON configuration. The reduction in force results from the bent-shape for the buckled shackle 130 providing for a shorter moment-arm of the force the buckled shackle 130 applies on the latch lever 120 about the first rotational joint 127. The bent shape and the moment-arm of the buckled shackle 130 are discussed in greater detail below.

In the ON configuration, as shown in FIG. 1, the contact surface 115 of the latch 110 contacts the contact surface 123 of the latch lever 120 to support the latch lever 120 in the ON configuration. The latch 110 thus counteracts the force of the buckled shackle 130 on the latch lever 120. As such, in the ON configuration, the latch 110 counteracts the force exerted by the coiled spring 150 and maintains the components of the tripping mechanism 125 in a static position.

When the latch 110 rotates about the rotational joint 119 (counterclockwise in the view in FIG. 1) sufficiently, the latch contact surface 115 is no longer in contact with the latch lever contact surface 123, releasing the latch lever. When the latch lever is released, a trip is initiated, and the circuit breaker transitions from the ON configuration to the TRIP configuration. Once the latch contact surface 115 is no longer in contact with the latch lever contact surface 123, the latch lever is free to rotate about the first rotational joint 127 (i.e., the latch lever is released). As a result, the change lever 160, under the force of the coiled spring 150, presses down in the −y direction on the rocker arm 180, which in turn causes the rocker 190 to affect an opening of the circuit (as described in greater detail in relation to FIG. 7).

The latch 110 may have a normal position (shown in FIG. 1) and a trip position in which the latch 110 is rotated counterclockwise as compared to the normal position. The normal position is a first position of the latch 110, and the trip position is a second position of the latch 110. Only a small and momentary rotation from the normal position to the trip position is necessary to initiate a trip according to some embodiments. The latch 110 is configured to initiate both thermal trips and magnetic trips, according to some embodiments. Specifically, the latch 110 includes a second extension 113, which may be a thermal trip extension, and a third extension 117, which may be a magnetic trip extension.

During thermal trips, the thermal trip extension 113 may be pushed to the left by a thermal trip component (such as a compensation bimetal component) contacting the thermal trip component contact surface 112, thus rotating the latch 110 to the trip position. During magnetic trips, the magnetic trip extension 117 may be pushed down in the −y direction by a magnetic trip component contacting the magnetic trip component contact surface 118, thus rotating the latch 110 to the trip position. The latch 110 may thus initiate both thermal trips and magnetic trips in the circuit breaker 100. While described as thermal and magnetic tripping mechanisms, any other type of mechanism can be used to detect trips including, for example, electronic and microprocessor mechanisms.

In the ON configuration of the circuit breaker 100, the latch lever contact surface 123 applies a normal force against the latch contact surface 115. A frictional force between contact surfaces 115 and 123 results from the normal force between the contact surfaces 115 and 123, as well as the coefficient of friction. The frictional force thus resists rotation of the latch 110 from the normal position to the trip position. A specified tripping force is thus required to overcome the frictional forces and initiate a trip. See further discussion in relation to FIG. 6 below.

Figure 2A:
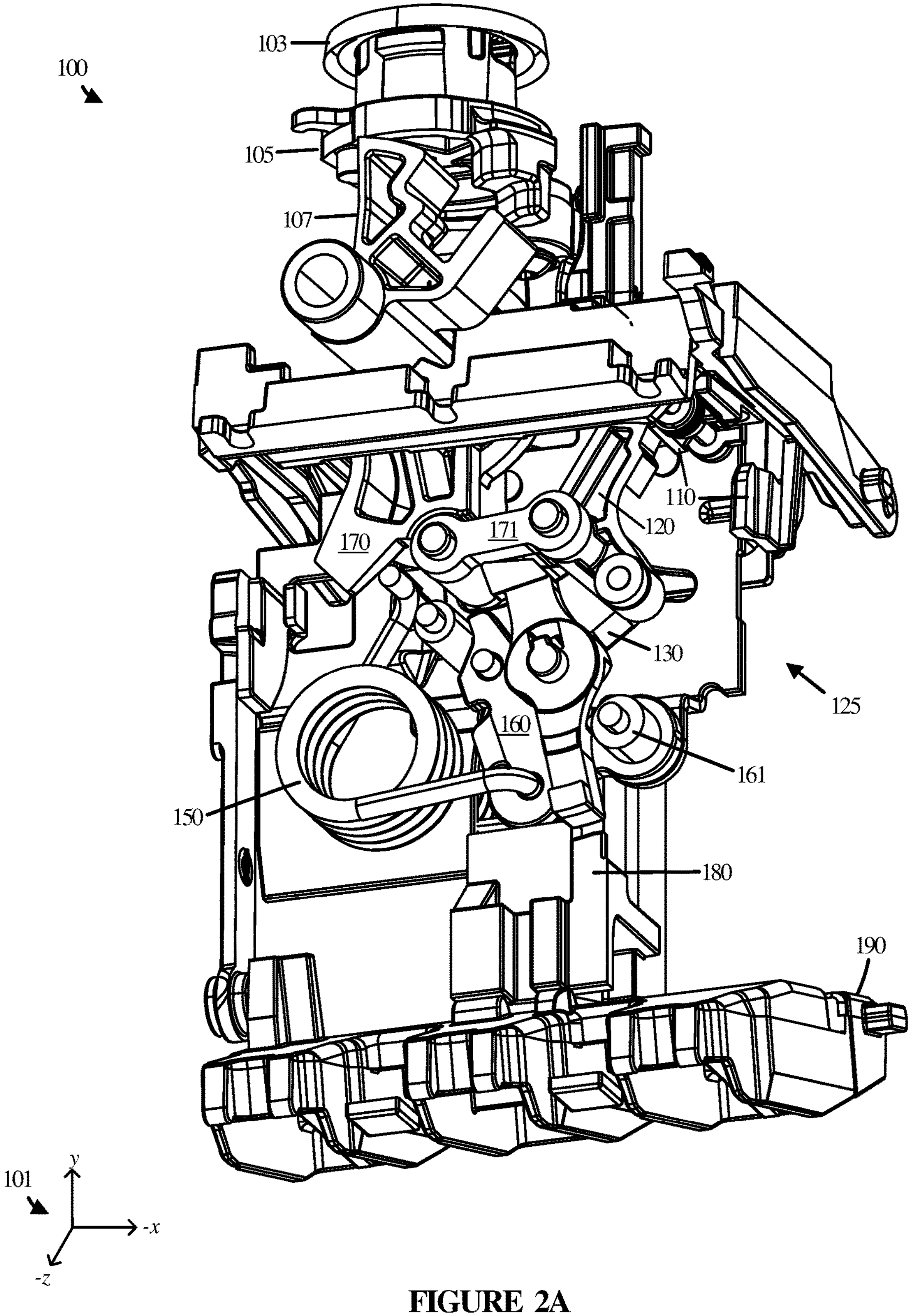
FIG. 2A is a circuit breaker in an "OFF" configuration, according to some embodiments.
Figure 2B:
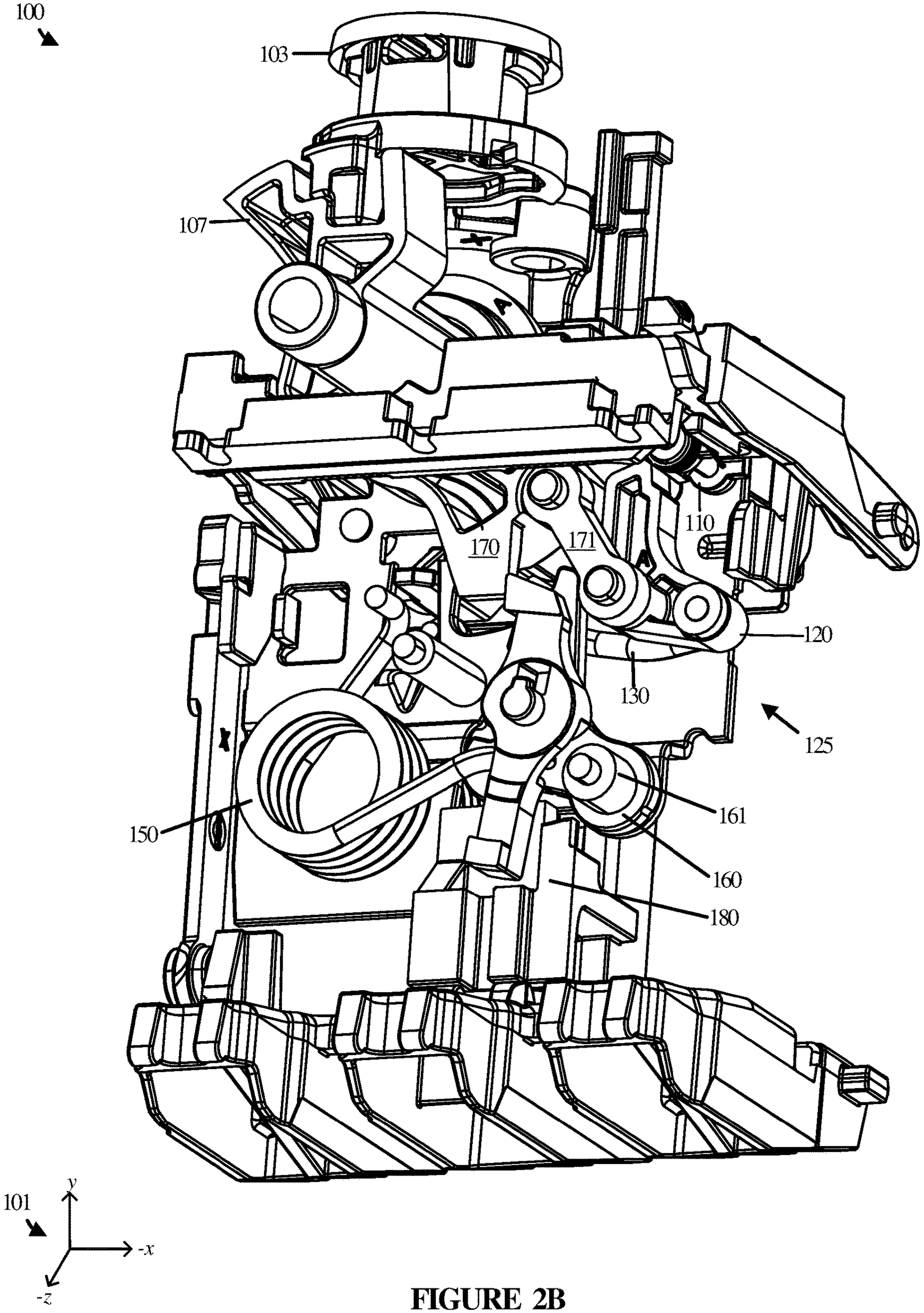
FIG. 2B is a circuit breaker in an "ON configuration, according to some embodiments.
Figure 2C:
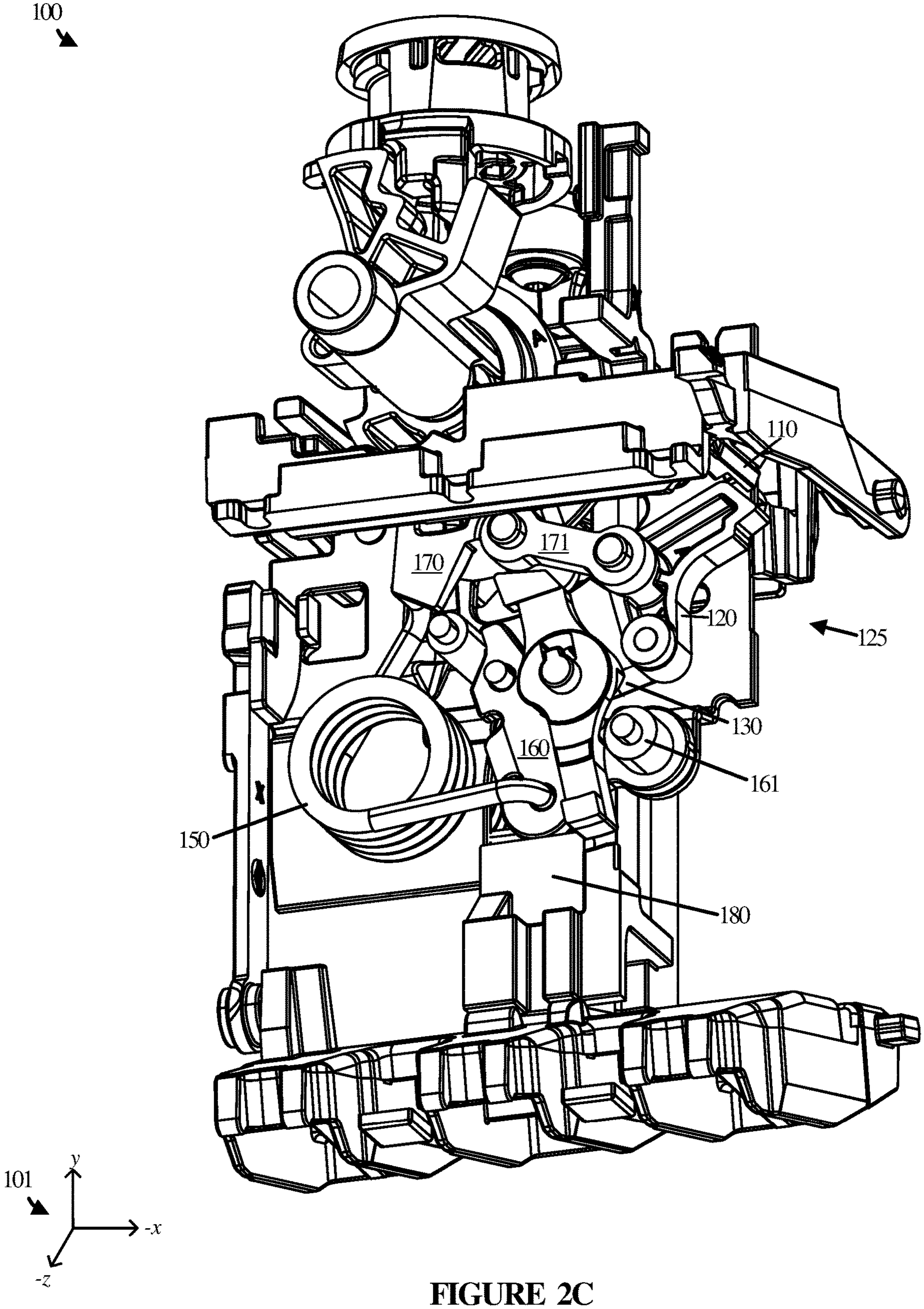
FIG. 2C is a circuit breaker in a "TRIP" configuration, according to some embodiments.

FIGS. 2A-2C show an oblique view of the circuit breaker 100. FIG. 2A shows the circuit breaker 100 in which the tripping mechanism 125 is in the OFF configuration. FIG. 2B shows the circuit breaker 100 in which the tripping mechanism 125 is in the ON configuration. FIG. 2C shows the circuit breaker 100 in which the tripping mechanism 125 is in the TRIP configuration.

In the OFF position shown in FIG. 2A, moving contacts in the circuit are separated from stationary contacts in the circuit. (Moving contacts 195 and stationary contacts 197 may be seen in an alternate view in FIG. 7). An operator may transition the circuit breaker 100 from the OFF configuration shown in FIG. 2A to the ON configuration shown in FIG. 2B by turning the switch 103 from an OFF setting to an ON setting. Specifically, the switch 103 may be rotated clockwise about an axis in the y direction, causing the toggle 170 to rotate about the z axis via the toggle wheel 107. The rotation of the toggle 170 causes the joint arm 171 to activate the latch lever 120 and load the tripping mechanism 125 into the ON configuration shown in FIG. 2B. It is noted that the change lever 160 rotates about the rotational joint 161 when transitioning from the OFF configuration to the ON configuration. FIG. 2B shows that the change lever 160 is in a rotated and raised position in FIG. 2B as compared to the position of the change lever 160 in FIG. 2A. The rotation of the change lever 160 to the position in FIG. 2B allows the rocker arm 180 to move upward and the rocker 190 to rotate, which in turn allows the moving contacts 195 to contact the stationary contacts 197 (see also FIG. 7). The settings of the switch 103 are discussed in greater detail with respect to FIGS. 8A-8C below.

An operator may transition the circuit breaker from the ON configuration in FIG. 2B to the OFF configuration in FIG. 2A by turning the switch 103 from the ON setting to the OFF setting. The turning of the switch 103 to the OFF setting causes the joint arm 171 to move to the OFF configuration shown in FIG. 2A. Turning the switch 103 to the OFF setting ultimately causes the change lever 160 to press against the rocker arm 180 under force of the coiled spring 150. This in turn causes the rocker 190 to rotate and separate the moving contacts 195 from the stationary contacts 197 (see also FIG. 7).

When the circuit breaker is in the ON position shown in FIG. 2B, a trip may be initiated by the latch 110 in the manner discussed in the discussion of FIG. 1 above. The ON position in FIG. 2B may also be considered a normal operating configuration of the circuit breaker 100. As discussed above, a trip is initiated by rotation of the latch 110 which causes an interruption of contact between the latch lever 120 and the latch 110. This interruption of contact frees the latch lever 120 to rotate due to the force of the buckled shackle 130, which in turn allows the change lever 160 to rotate about the rotational joint 161 into the TRIP configuration shown in FIG. 2C. During a trip, the change lever 160 rotates and pushes the rocker arm 180 downward in the −y direction to separate the moving contacts 195 from the stationary contacts 197 (see also FIG. 7). The change lever 160 rotates in this manner due to the force exerted by the coiled spring 150.

Figure 3:
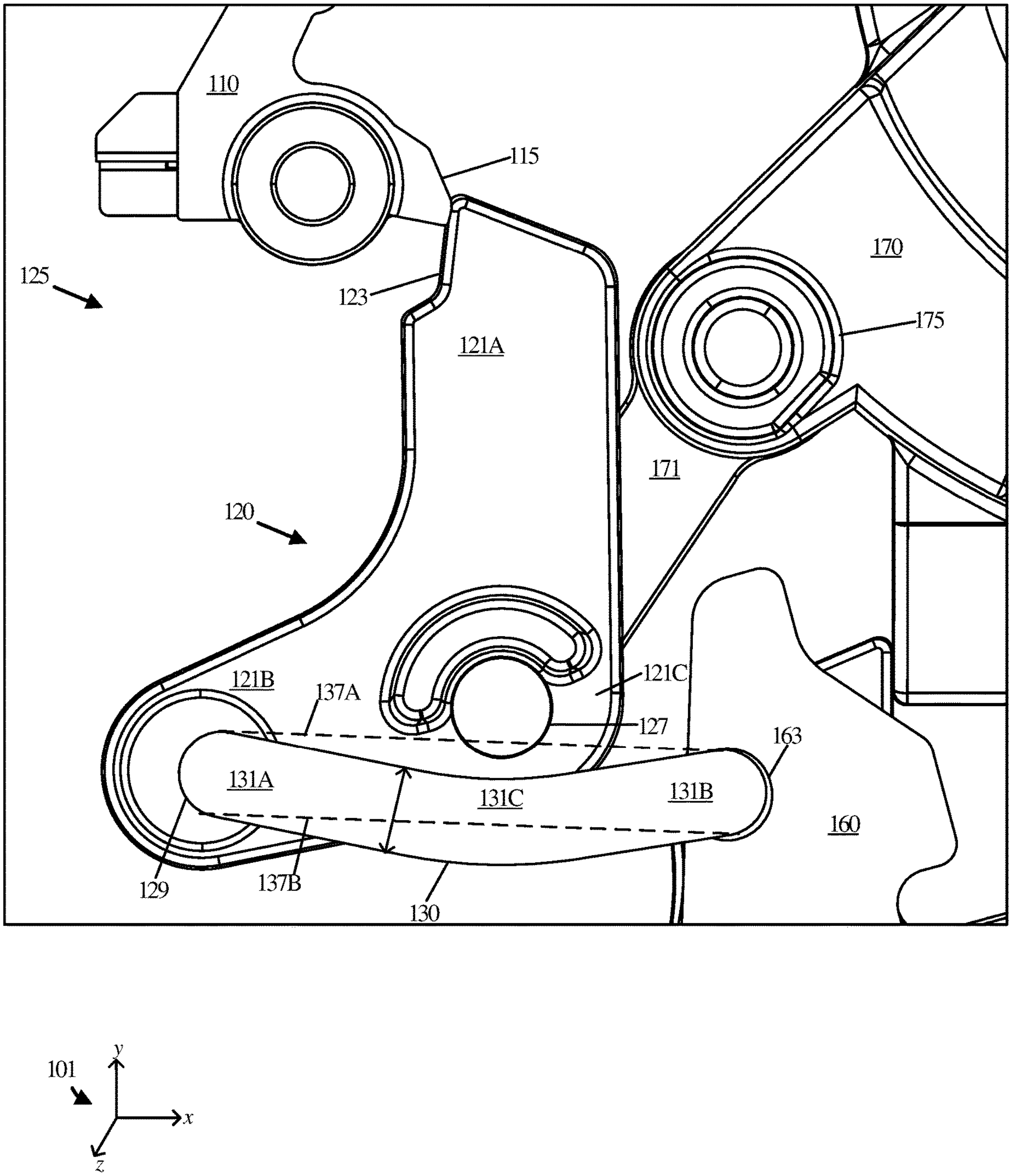
FIG. 3 is a front view of a trip mechanism, according to some embodiments.

FIG. 3 shows the tripping mechanism 125 according to some embodiments. FIG. 3 shows the tripping mechanism 125 in the ON configuration (i.e., the circuit breaker is ON, allowing current flow). The contact surface 123 of the latch lever 120 applies a force against the contact surface 115 of the latch 110 as discussed in relation to FIG. 1 above. The latch lever 120 generally has an "L" shape with a first end 121A, a second end 121B and a bend 121C between the first end 121A and the second end 121B. The latch lever 120 has a first joint 127 and a second joint 129. The first joint 127 and the second joint 129 are rotational joints, which may be circular sockets allowing for rotation in the x-y plane. And end of the joint arm 171 rotates within the first rotational joint 127. The other end of the joint arm 171 is engaged in the rotational joint 175 of the toggle 170.

The latch lever 120 is rotatably coupled to the buckled shackle 130 at the second rotational joint 129. The buckled shackle includes a first end 131A and a second end 131B. In some embodiments, the first end 131A and the second end 131B are integral such that they form a single unitary piece without detachable parts. The buckled shackle also includes a bend 131C between the first end 131A and the second end 131B. The first end 131A, the second end 131B and the bend 131C of the buckled shackle 130 form a unitary element according to some embodiments. The first end 131A of the buckled shackle 130 is rotatably coupled to the second rotational joint 129 of the latch lever 120. The second end 131B of the buckled shackle 130 is rotatably coupled to the third rotational joint 163 of the change lever 160. The buckled shackle 130 may be generally tubular such that cross sections of the buckled shackle 130 are circular. In some embodiments, the buckled shackle 130 is metal. In other embodiments the buckled shackle 130 may be another material such as plastic, composite material, or any combination of these materials. While a unitary buckled shackle 130 is described above, it is noted that other embodiments the buckled shackle may include multiple parts attached to each other.

The first end 131A of the buckled shackle 130 exerts a force on the second rotational joint 129 when the tripping mechanism 125 is in the ON configuration. The buckled shackle 130 may exert a general rightward force on the second rotational joint 129 in the ON configuration. The buckled shackle 130 has a bend 131C between the first section 131A and the second section 131B. The bend 131C of the buckled shackle 130 is selected such that a force between the latch lever contact surface 120 and the latch contact surface 115 falls within a sensitivity range when the tripping mechanism is in the ON configuration. In some embodiments, the sensitivity range is between 6 Newtons to 8 Newtons. Specifically, the bend 131C in the buckled shackle 130 is selected to reduce a moment-arm of the force exerted by the buckled shackle 130 on the latch lever 120 about the first rotational joint 127. This in turn results in a lowering of the force exerted by the contact surface 123 of the latch lever 120 against the contact surface 115 of the latch 110. This reduction in the force between the contact surfaces 115 and 123 allows the latch 110 to be more sensitive. Specifically, lower tripping forces are required to rotate the latch 110 and initiate a trip.

In FIG. 3, the dashed lines 137A and 137B represent lines from the outer diameter of the first end 131A of the buckled shackle 130 to the outer diameter of the second end 131B of the buckled shackle 130. As shown in FIG. 3, the dashed line 137A connects an upper side of the first end 131A to an upper side of the second end 131B. The dashed line 137A may be relationally aligned with a portion of the first rotational joint 127. Here, "relationally aligned" means that the line 137A and part of the first rotational joint 127 are located on the same reference line perpendicular to the rotational plane of the first rotational joint 127. In FIG. 3, the rotational plane of the first rotational joint 127 is the x-y axis and the reference line is perpendicular to the z axis. FIG. 3 also shows that no portion of the buckled shackle 130 is relationally aligned with the first rotational joint 127 in the ON configuration. In other words, no portion of the buckled shackle 130 is aligned with the first rotational joint in a direction perpendicular (the z direction) to the rotational plane (the x-y plane) of the first rotational joint.

The bend 131C allows the buckled shackle 130 to be offset from the first rotational joint 127 in the ON configuration as shown in FIG. 3. A reduced moment-arm of the force the buckled shackle 130 exerts on the latch lever 120 is thus maintained without the buckled shackle 130 being vertically aligned with the joint 127 in the ON configuration. The bend 131C of the buckled shackle 130 also allows the buckled shackle 130 to avoid undesirable contact with other components during operation of the circuit breaker 100. The buckled shackle 130 is shaped, for example, to avoid contact with other components during the transition of the tripping mechanism 125 from the ON configuration to the TRIP configuration. The bend 131C in the buckle shackle 130 allows the buckled shackle 130 to avoid such undesirable contact with other components. For example, an end portion of the joint arm 171 may pass through the first rotational joint 127. The bend 131C in the buckled shackle 130 is configured such that the buckled shackle 130 does not contact the joint arm 171 or other components during transitions between the ON, OFF, and TRIP configurations.

Figure 4:
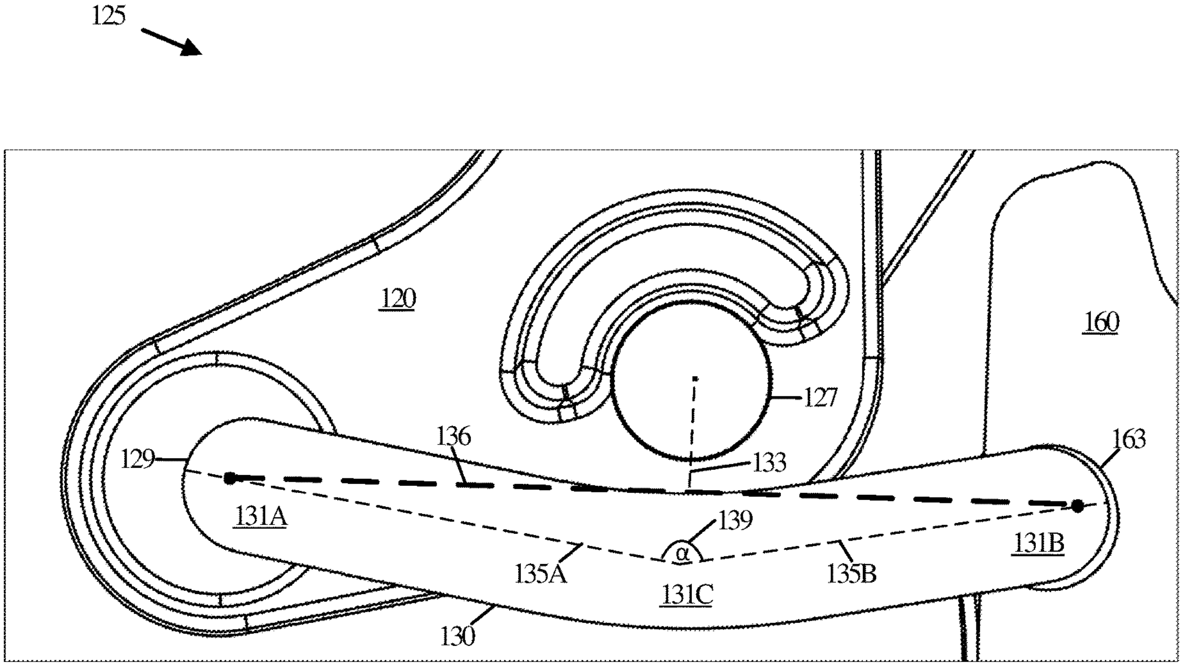
FIG. 4 is a close-up view of the trip mechanism, according to some embodiments.

FIG. 4 is a close-up view of a portion of the tripping mechanism 125 according to some embodiments. In FIG. 4, the dashed line 136 represents a distance from the rotational center of the second rotational joint 129 to the rotational center of the third rotational joint 163 at the change lever 160. The dashed line 136 represents a force-arm of the buckled shackle 130. Specifically, the force exerted by the buckled shackle 130 on the second rotational joint 129 may be generally rightward in FIG. 4, in the direction of the dashed line 136. The dashed line 133 is a perpendicular line from the dashed line 136 to the rotational center of the first rotational joint 127. The dashed line 133 thus represents a moment-arm of the force the buckled shackle 130 exerts on the latch lever 120 about the first rotational joint 127. In some embodiments, the distance of the moment-arm represented by the dashed line 133 may be smaller than the diameter of the first rotational joint 127.

The first section 131A has a centerline 135A and the second section 131B has a centerline 135B. The first section centerline 135A and the second section centerline 135B meet at the bend 131C. The angle 139 is the angle between the first section centerline 135A and the second section centerline 135B.

The angle 139 may be selected to reduce the length of the dashed line 133 representing the moment-arm. This reduction in the length of the moment-arm results in a reduced force of the latch lever 120 against the latch 110 in the ON configuration. The angle 139 at the bend 131C allows the moment-arm of the buckled shackle 130 about the first rotational joint 127 to be reduced, while avoiding contact with other components of the circuit breaker 100 during transitions between configurations. In some examples, the angle 139 is approximately 160 degrees. In other examples, the angle 139 may be between 150 and 170 degrees. Note that if the buckled shackle 130 were straight, the length of the moment-arm would be increased as it would need to avoid collision with the other components extending from rotational joint 127.

Figure 5:
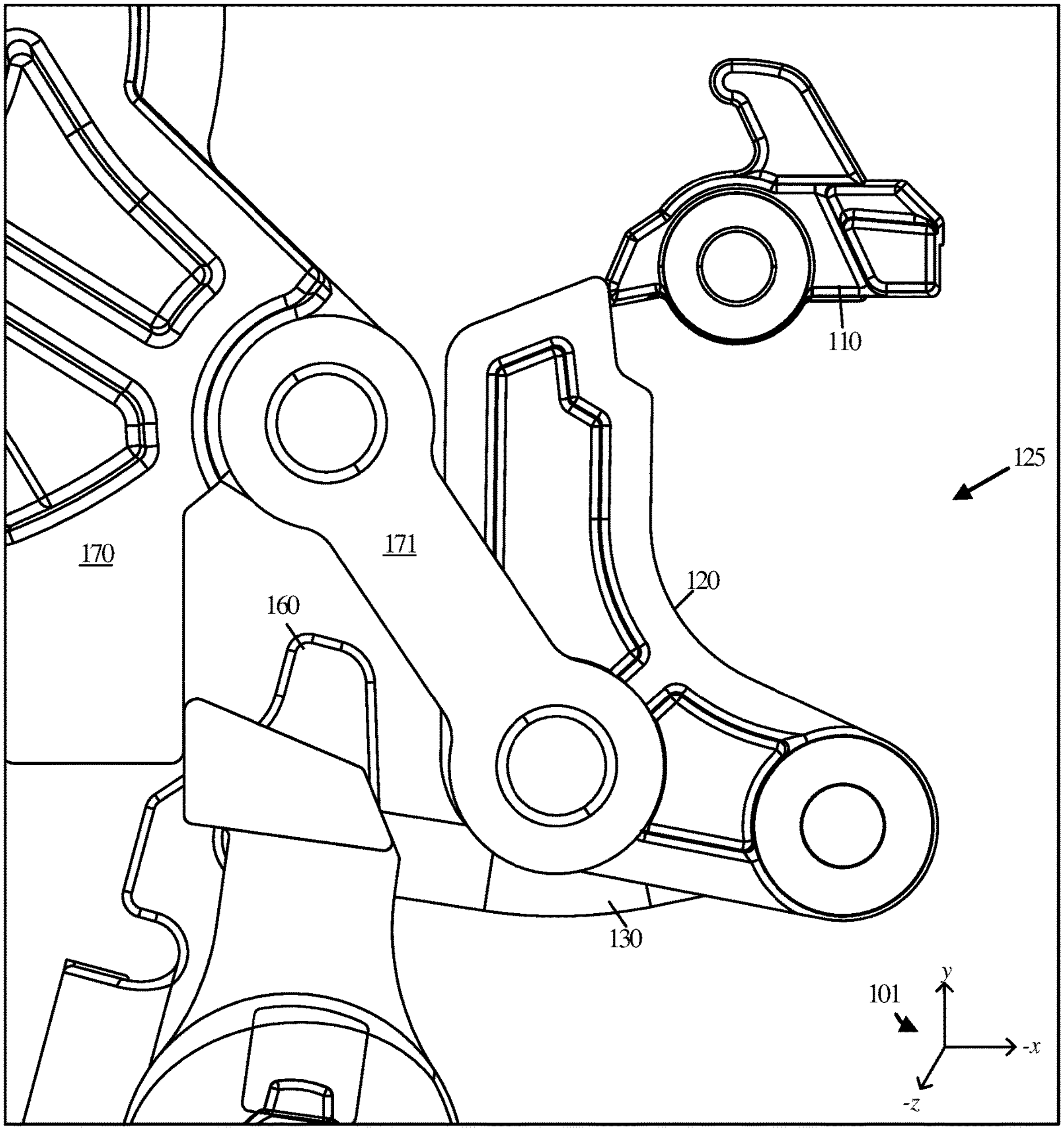
FIG. 5 is a rear view of the trip mechanism, according to some embodiments.

FIG. 5 shows a view of the tripping mechanism 125 from the opposite direction from the view in FIGS. 3 and 4. FIG. 5 shows the tripping mechanism 125 in the ON configuration. The buckled shackle 130 is coupled between the change lever 160 and the latch lever 120. The latch lever 120 applies a force against the latch 110. The latch lever 120 is coupled to the toggle 170 via the joint arm 171.

Figure 6:
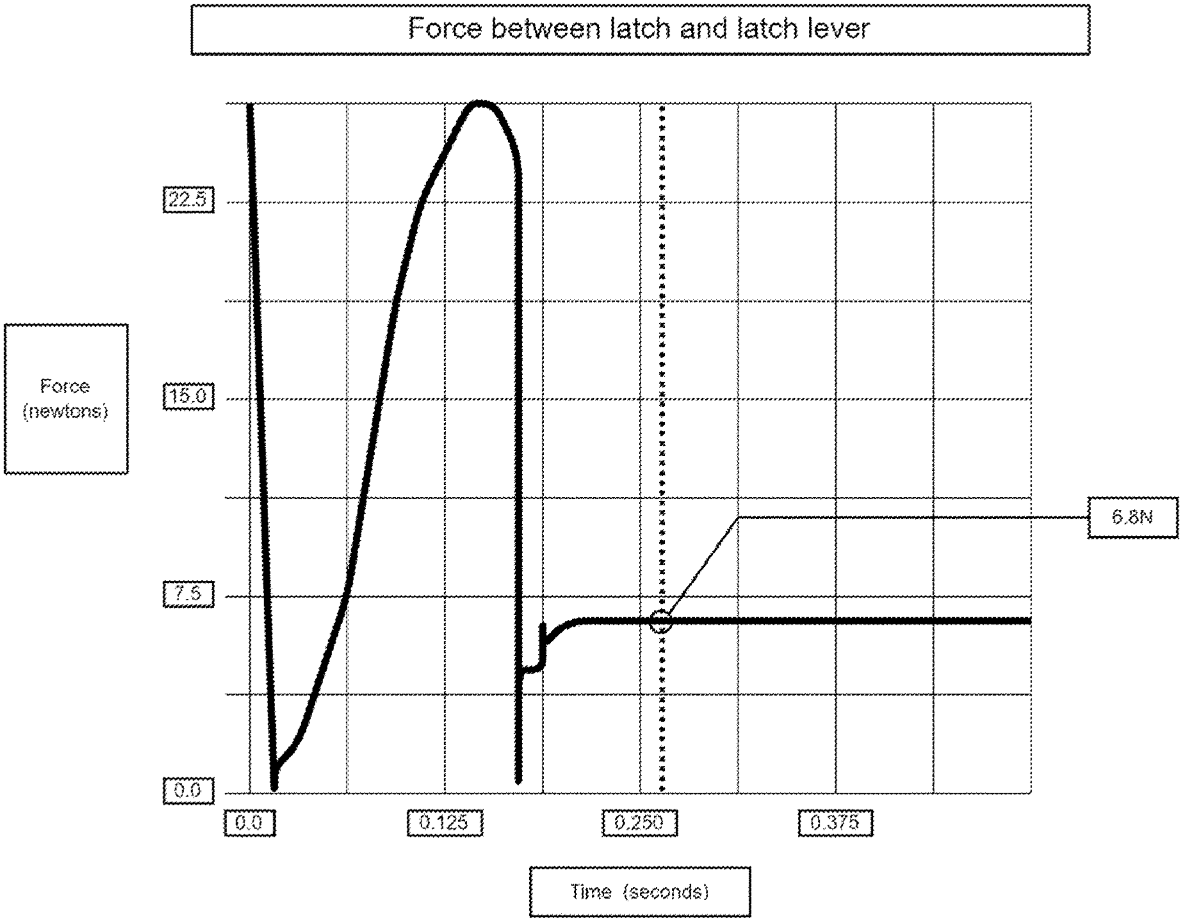
FIG. 6 is a force-time graph of the circuit breaker, according to some embodiments.

FIG. 6 shows the force the latch lever 120 applies against the latch 110 during the transition of the circuit breaker 100 from the OFF state (as shown in FIG. 2A) to the on state (as shown in FIG. 2B). When an operator uses the switch 103 to set the circuit breaker 100 in the ON position, the force of the latch lever 120 on the latch 110 (i.e. between the contact surfaces 115 and 123) reaches a steady state of approximately 6.8 Newtons in the ON configuration, according to some embodiments. The desired force between the latch lever 120 and latch 110 is achieved in part by including the buckled shackle 130, with the bend 131C to reduce the moment-arm of the force applied by the buckled shackle 130 on the latch lever 120, thus reducing the torque on the latch lever 120. A reduced force between the latch 110 and the latch lever 120 reduces the tripping force required for the latch 110 to rotate and initiate a trip. This allows for a greater sensitivity and accuracy in the thermal trip mechanism and the magnetic trip mechanism that engage with the latch 110 to initiate trips.

The tripping force, the force on the latch 110 required to initiate a trip (at the thermal tripping extension 113 or the magnetic tripping extension 117), may be predetermined to be within a zone of sensitivity. While lower tripping forces provide certain benefits such as increased sensitivity, the tripping force may be selected to be high enough to avoid unwanted trips, such as trips resulting from vibrations in the industrial environment. The tripping force depends on the force between the latch 110 and latch lever, 120, the surface area of the contact between these components, and the coefficient of friction between the contact surfaces 115, 123. In some embodiments the coefficient of friction between the contact surfaces 115 and 123 may be 0.2. In some embodiments the tripping force is approximately 1.4 Newtons.

In some embodiments, the force between the latch 110 and the latch lever 120 is approximately 6.8 Newtons in the ON configuration, and the tripping force is approximately 1.4 Newtons. However, in other embodiments, the force between the latch lever 120 and the latch 110 may be between 6 and 8 Newtons, and the tripping force may be between 1 and 1.8 Newtons.

In addition to reducing the force between the latch 110 and the latch lever 120, the reduced torque on the latch lever 120 may reduce strain on components within the tripping mechanism 125. This may provide for cost savings in the selection of materials and the design of the components in the tripping mechanism 125. These cost savings may be achieved in part by including the buckled shackle 130 having a bend 131C.

Figure 7:
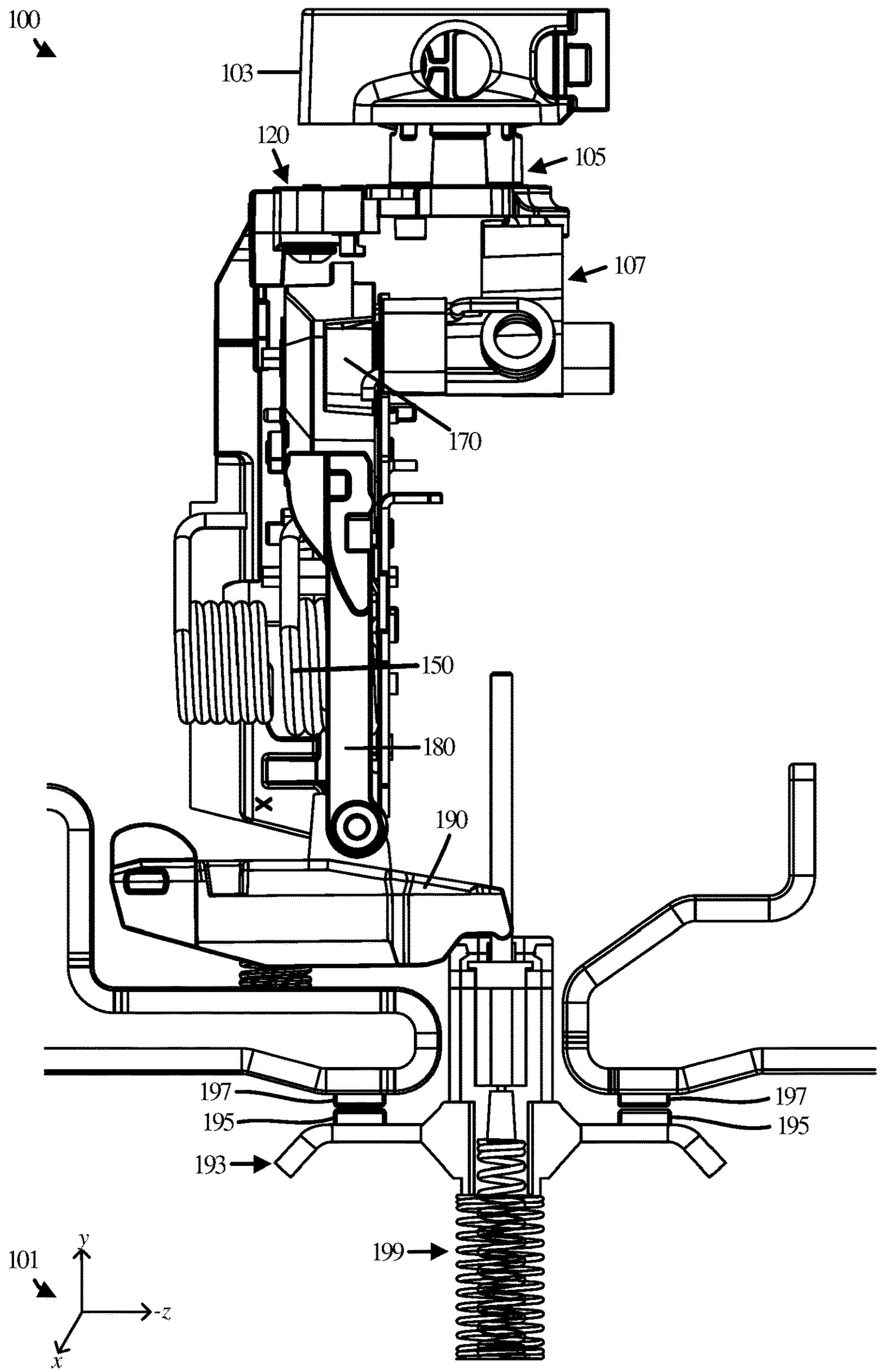
FIG. 7 is an alternate view of the circuit breaker, according to some embodiments.

FIG. 7 illustrates an alternate view of the circuit breaker 100 according to some embodiments. The circuit breaker 100 in FIG. 7 may be a side view of the circuit breaker 100 of FIGS. 1-5.

The circuit breaker 100 includes a switch 103, a rotary disk 105, a toggle wheel 107, a plunging spring 199, a plunging element 193, moving contacts 195, and stationary contacts 197.

The switch 103 is a rotary switch on an outside surface of the circuit breaker that, in some examples, can be rotated between three settings—"ON," "OFF," and "TRIP." In some examples, the switch 103 rotates ninety degrees between "ON" and "OFF." The switch 103 may be integral with the rotary disk 105 such that the rotary disk 105 rotates with the switch 103.

The rotary disk 105 interfaces with the toggle wheel 107, which in turn interfaces with the toggle 170. The toggle is thus indirectly coupled to the rocker 190 via the tripping mechanism 125 as discussed in detail above. The rocker 190 is configured to open the circuit by separating the moving contacts 195 from the stationary contacts 197 via the plunging element 193. The plunging element 193 may be biased upward by the plunging spring 199. The rocker 190 is responsive to upward and downward movement (with respect to the y direction) of the rocker arm 180, as discussed above.

In embodiments of the present technology, various components of circuit breaker 100 are comprised of metal, plastic, a composite material, or any combination of these.

Figure 8A:
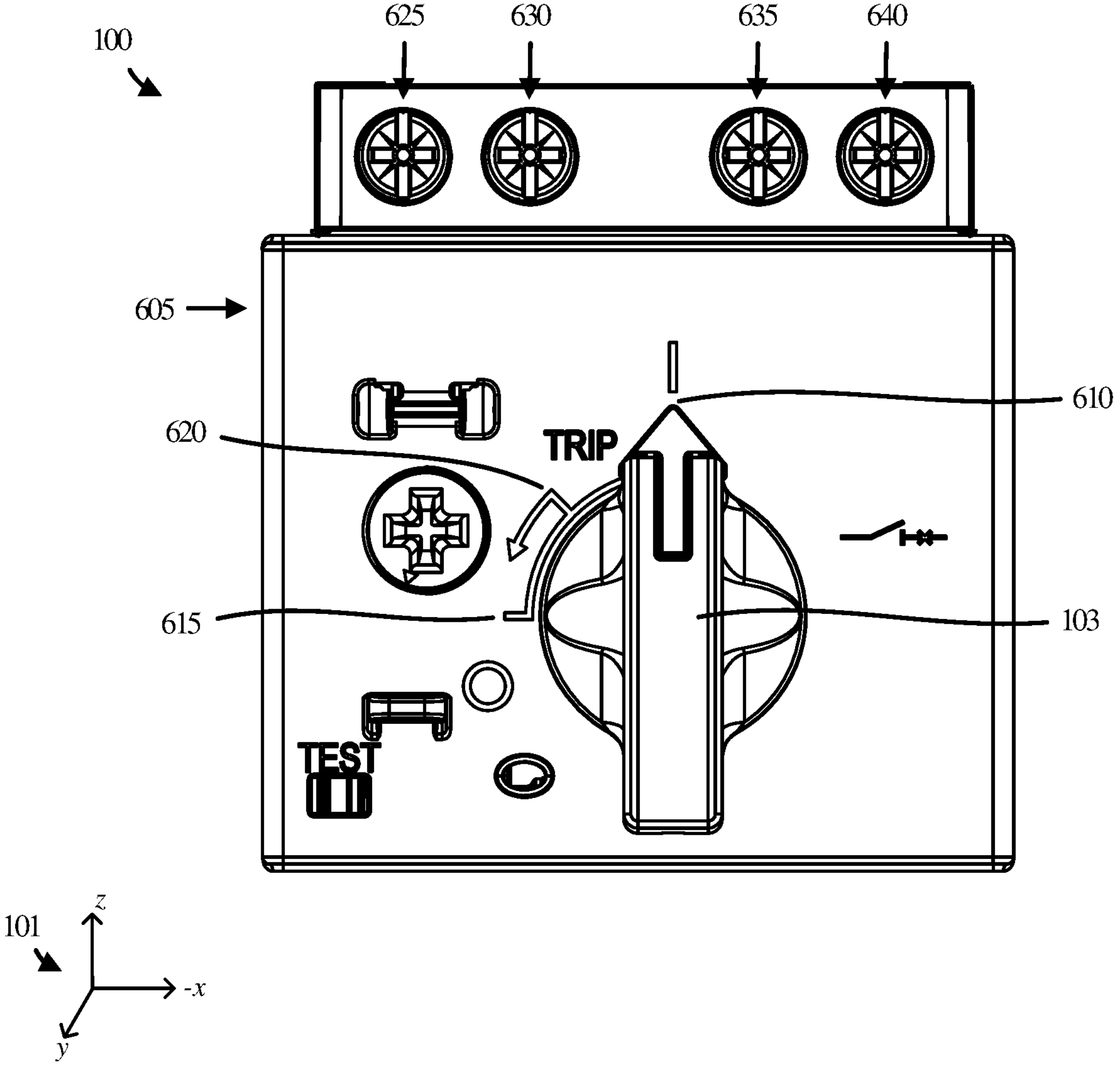
FIGS. 8A-8C illustrate three positions of a circuit breaker switch, according to some embodiments.

FIG. 8A illustrates a switching faceplate 605 of the circuit breaker 100 in accordance with some embodiments of the present technology. The switching faceplate 605 includes the switch 103, an "ON" position 610, an "OFF" position 615, a "TRIP" position 620, auxiliary port 625, auxiliary port 630, auxiliary port 635, and auxiliary port 640. The circuit breaker 100 may include fewer or additional components as compared to what is shown in the example of FIG. 8A. FIG. 8A further includes coordinate system 101, in reference to which elements of FIG. 8A are described.

In the example of FIG. 8A, the switch 103 is rotated to the "ON" position 610. When the switch 103 is turned to the "ON" position 610, the rotary disk 105 is also rotated to its corresponding "ON" position. When in the "ON" position, tripping mechanism 125 is in the ON configuration, the moving contacts 195 (see FIG. 7) are in contact with the stationary contacts 197 (see FIG. 7), and current is flowing through the circuit breaker 100. Thus, in some embodiments, the state of switching faceplate 605 as shown in FIG. 6A corresponds to the state of the circuit breaker 100 in FIG. 2B, in which the tripping mechanism 125 is in the ON configuration.

Figure 8B:
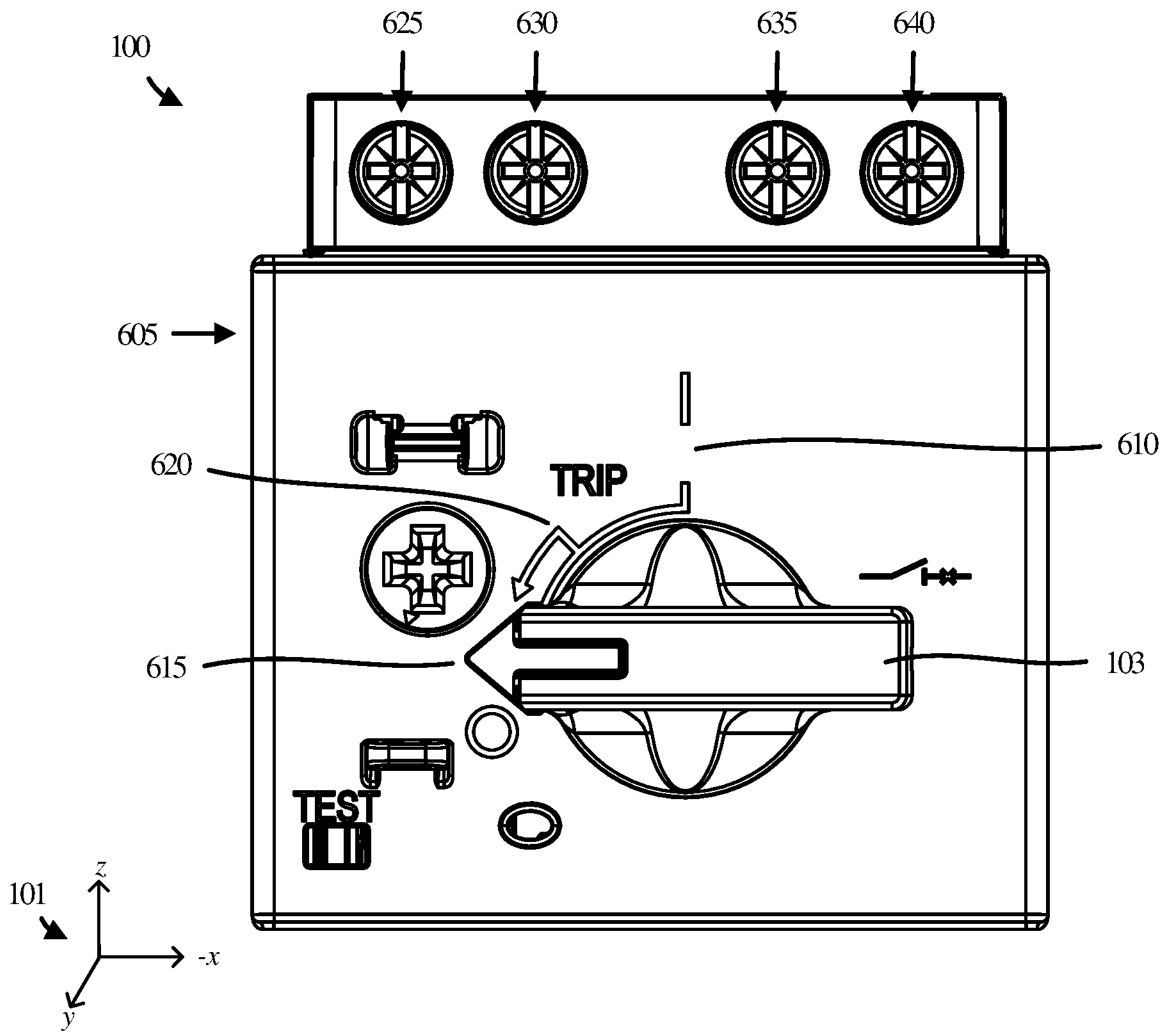

FIG. 8B illustrates the switching faceplate 605 of circuit breaker 100 in accordance with some embodiments of the present technology. The switching faceplate 605 includes the switch 103, an "ON" position 610, an "OFF" position 615, a "TRIP" position 620, auxiliary port 625, auxiliary port 630, auxiliary port 635, and auxiliary port 640. The circuit breaker 100 may include fewer or additional components as compared to what is shown in the example of FIG. 8B. FIG. 8B further includes the coordinate system 101, in reference to which elements of FIG. 8B are described.

In the example of FIG. 8B, switch 103 is rotated to the "OFF" position 615. When the switch 103 is turned to the "OFF" position 615, the rotary disk 105 is also rotated to its corresponding "OFF" position. When in the "OFF" position, the tripping mechanism 125 is in the OFF configuration, the moving contacts 195 (see FIG. 7) are separated from the stationary contacts 197 (see FIG. 7), and current is not flowing through the circuit breaker 100. Thus, in some embodiments, the state of switching faceplate 605 as shown in FIG. 8B corresponds to the state of circuit breaker 100 in FIG. 2A, in which the tripping mechanism is in the OFF configuration.

Figure 8C:
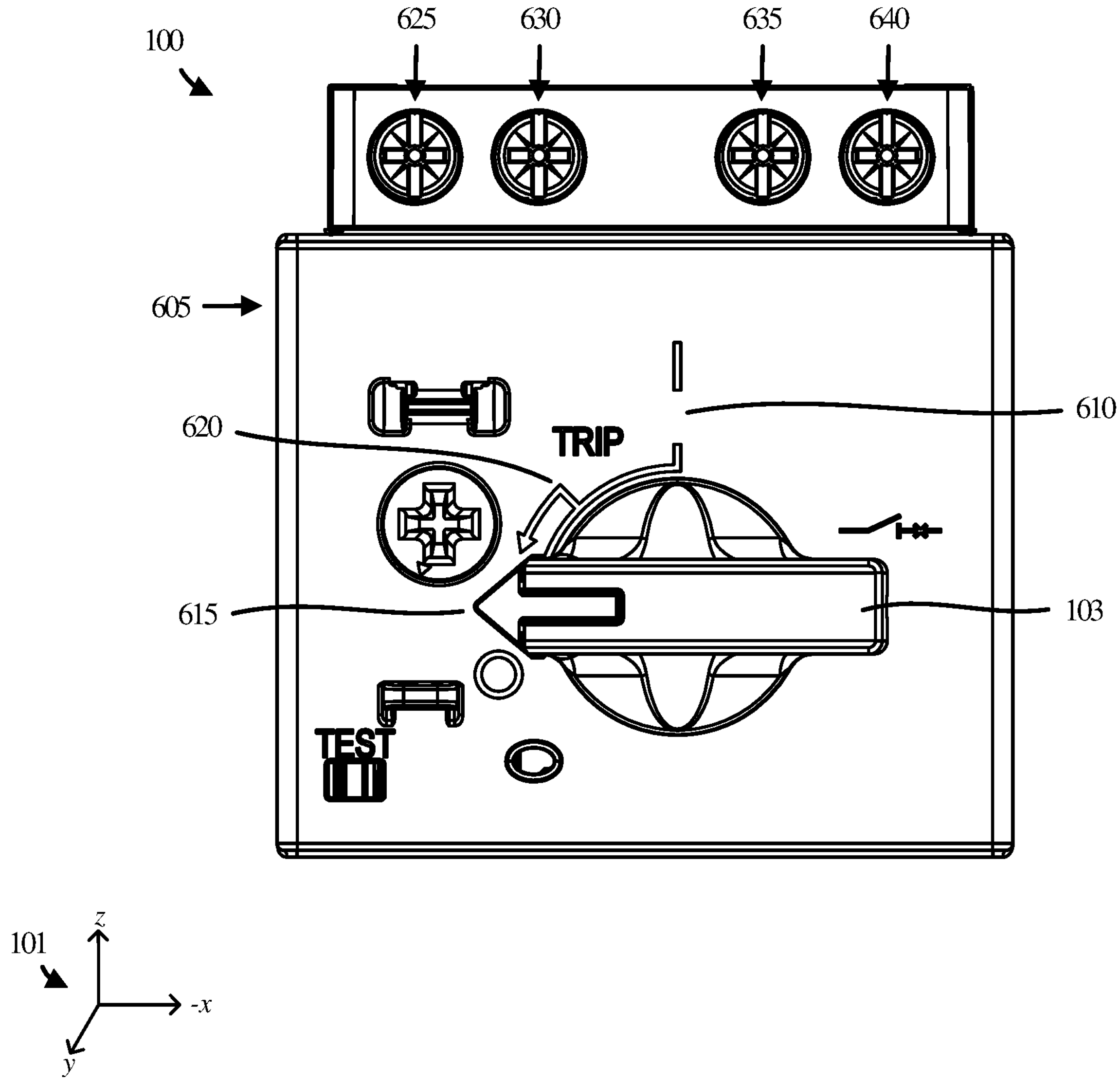

FIG. 8C illustrates the switching faceplate 605 of the circuit breaker 100 in accordance with some embodiments of the present technology. The switching faceplate 605 includes the switch 103, the "ON" position 610, the "OFF" position 615, the "TRIP" position 620, auxiliary port 625, auxiliary port 630, auxiliary port 635, and auxiliary port 640. The circuit breaker 100 may include fewer or additional components as compared to what is shown in the example of FIG. 8C. FIG. 8C further includes the coordinate system 101, in reference to which elements of FIG. 8C are described.

In the example of FIG. 8C, the switch 103 is rotated to the "TRIP" position 620. When the switch 103 is turned to the "TRIP" position 620, the rotary disk 105 is also rotated to the "TRIP" position. The switch 103 may, when no contact welds are present, be turned to the "TRIP" position 620 momentarily as it is being rotated between the "ON" position 610 and the "OFF" position 615. However, in contact welding scenarios, the switch 103 cannot be turned past the "TRIP" position 620 when it is turned toward "OFF" position 615 from "ON" position 610. In some embodiments, the circuit breaker 100 may include interlock components that prevent rotation past the "TRIP" position 620 during contact welding scenarios.

When the switch 103 is stopped from rotating to the "OFF" position 615 by interlock components, contact welding has occurred. Thus, when in the "TRIP" position 615 in a contact welding scenario, the moving contacts 195 (see FIG. 7) are in contact with the stationary contacts 197 (see FIG. 7), and current is flowing through the circuit breaker 100.

Figure 9:
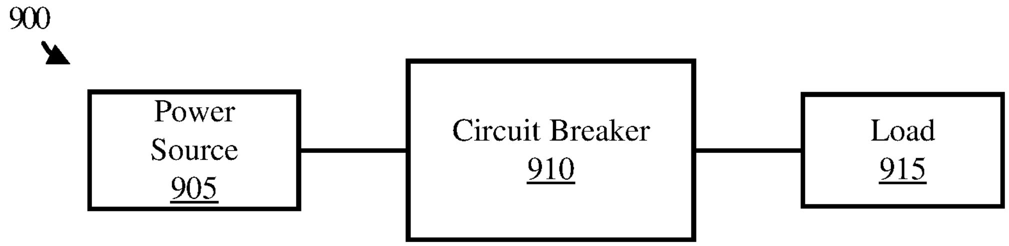
FIG. 9 is a schematic view of a circuit, according to some embodiments.

FIG. 9 illustrates circuit 900 in which a circuit breaker in accordance with the present disclosure may be implemented. Circuit 900 includes power source 905, circuit breaker 910, and load 915. Circuit 900 may include fewer or additional components as compared to what is shown in the example of FIG. 9.

Power source 905 is representative of any device or electrical component delivering power into circuit 900. Power source 905 may be an independent voltage source, a dependent voltage source, or other type of voltage source. Examples of such power sources include generators, photovoltaic cells, thermopiles, primary-cell batteries, a power grid, and the like. Power source 905 creates electrical voltage that causes current to flow through circuit 900 via one or more connecting wires or other connection components. Load 915 is representative of any device or electrical component that consumes electrical energy. Load 915 may represent a resistive load, inductive load, capacitive load, or combined load. Examples of loads include electric lamps, air conditioners, motors, resistors, heaters, processors, precision manufacturing equipment, data servers, pumps, fans, generators, robotic machinery, industrial automation controllers, and the like. Circuit breaker 910 is representative of any circuit breaker in accordance with the technology disclosed herein. For example, circuit breaker 910 may be representative of circuit breaker 100 from the preceding figures. Circuit breaker 910 may alternatively be representative of a circuit breaker system that differs from circuit breaker 100 but includes the tripping mechanism 125 including the buckled shackle 130, latch lever 120, and latch 110 as described above.

In accordance with the example of FIG. 9, current flows from power source 905 to load 915. Circuit breaker 910 protects circuit 900, including power source 905 and load 915, by stopping the flow of current in cases of short circuit or overload. Thus, in accordance with the present disclosure, circuit breaker 910 is a circuit breaker that may include, for example, thermal tripping elements, magnetic tripping elements, microprocessor tripping elements, electronic tripping elements, or a combination thereof. Circuit breaker 910 further includes one or more tripping mechanisms, such as tripping mechanism 125 from the preceding figures, configured to initiate an indication that a thermal or magnetic trip occurred. Circuit breaker 910 may open circuit 900 to stop current flow when an overcurrent condition or short circuit condition occurs.

The above description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Unless the context clearly requires otherwise, throughout the description and the claims, the words “include,” “comprise,” “comprising,” and the like are to be construed in an inclusive sense, as opposed to an exclusive or exhaustive sense; that is to say, in the sense of “including, but not limited to.” As used herein, the terms “connected,” “coupled,” or any variant thereof means any connection or coupling, either direct or indirect, between two or more elements. Additionally, the words “herein,” “above,” “below,” and words of similar import, when used in this application, refer to this application as a whole and not to any particular portions of this application. Where the context permits, words in the above Detailed Description using the singular or plural number may also include the plural or singular number, respectively. The word “or” in reference to a list of two or more items, covers all of the following interpretations of the word: any of the items in the list, all of the items in the list, and any combination of the items in the list.

The phrases “in some embodiments,” “according to some embodiments,” “in the embodiments shown,” “in other embodiments,” and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description is not intended to be exhaustive or to limit the technology to the precise form disclosed above. While specific examples of the technology are described for illustrative purposes, various equivalent modifications are possible within the scope of the technology, as those skilled in the relevant art will recognize. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in several ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words “means for” but use of the term “for” in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A tripping mechanism comprising:

a latch comprising:

a pivoting body, a first extension disposed on the pivoting body at a first location, the first extension comprising a latch contact surface, and a second extension disposed on the pivoting body at a second location, the second extension comprising a trip component contact surface, wherein movement of a trip component in contact with the trip component contact surface causes the pivoting body to pivot about a first axis from a first position to a second position;

a latch lever comprising:

a first end, a second end, and a bend disposed between the first end and the second end, a first rotational joint disposed at the bend and a second rotational joint disposed at the first end and spaced apart from the first rotational joint, a latch lever contact surface disposed at the second end, wherein the latch lever moves between an on position and a trip position, wherein movement of the latch to the second position causes the latch lever to move from the on position to the trip position; and a buckled shackle comprising:

a first section comprising a first end coupled to the second rotational joint, a second section comprising a second end coupled to a change lever, wherein the second section is integral with the first section, and a bend having an oblique angle between the first section and the second section, wherein the oblique angle is selected such that a force exerted by the latch lever contact surface on the latch contact surface falls within a sensitivity range when the latch lever is in the on position and the latch is in the first position.

2. The tripping mechanism of claim 1, further comprising:

a joint arm having a first end and a second end, the first end being rotatably coupled to the first rotational joint and the second end being coupled to a toggle, wherein the toggle is operably coupled to a switch.

3. The tripping mechanism of claim 1, wherein the buckled shackle bends around the first rotational joint when the latch lever is in the on position such that at least a portion of the first rotational joint is located between the first end and the second end of the buckled shackle.

4. The tripping mechanism of claim 1, wherein the change lever comprises a fixed rotational joint, and wherein the change lever is coupled to a coiled spring that applies a force on the change lever when the latch lever is in the on position.

5. The tripping mechanism of claim 1, wherein the sensitivity range is between 6 Newtons and 8 Newtons.

6. The tripping mechanism of claim 1, wherein the oblique angle between the first section and the second of the buckled shackle is between 150 degrees and 170 degrees.

7. The tripping mechanism of claim 1, wherein a tripping force exerted by the trip component contact surface on the first extension of the latch needed to move the latch from the first position to the second position is approximately 1.4 Newtons.

8. The tripping mechanism of claim 1, wherein:

the trip component is a thermal trip component, the trip component contact surface of the second extension of the latch is a thermal trip component contact surface, the latch further comprises a third extension disposed on the pivoting body at a third location, the third extension comprises a magnetic trip component contact surface, and movement of a magnetic trip component in contact with the magnetic trip component contact surface causes the pivoting body to pivot about the first axis from the first position to the second position.

9. The tripping mechanism of claim 1, further comprising:

a third rotational joint disposed in the change lever, wherein:

the second end of the buckled shackle is rotatably coupled to the third rotational joint, a line from a rotational center of the second rotational joint to a rotational center of the third rotational joint is aligned with the first rotational joint in a direction perpendicular to a rotational plane of the first rotational joint when the latch lever is in the on position.

10. The tripping mechanism of claim 9, wherein when the latch lever is in the on position, no portion of the buckled shackle is aligned with the first rotational joint in a direction perpendicular to the rotational plane of the first rotational joint.

11. A circuit breaker comprising:

a stationary contact disposed in a circuit;

a moving contact that moves between a first position in which the moving contact physically contacts the stationary contact and a second position in which the moving contact is separated from the stationary contact;

a switch being selectable between an ON state in which the moving contact physically contacts the stationary contact and an OFF state in which the moving contact is separated from the stationary contact;

a rotary disk coupled to the switch; and a tripping mechanism coupled to the rotary disk, wherein the tripping mechanism comprises:

a latch comprising a first extension having a latch contact surface and a second extension that receives a mechanical indication of a trip condition in the circuit breaker, wherein the latch moves in response to the mechanical indication to initiate a trip response;

a latch lever, comprising:

a first rotational joint, a second rotational joint spaced apart from the first rotational joint, and a latch lever contact surface that applies a force against the latch contact surface of the latch when the latch lever is in an on position corresponding to the ON state of the switch; and a buckled shackle comprising:

a first section comprising a first end coupled to the second rotational joint, a second section comprising a second end coupled to a change lever, wherein the second section is integral with the first section, and a bend having an oblique angle between the first section and the second section, wherein the oblique angle is selected such that a force exerted by the latch lever contact surface on the latch contact surface falls within a sensitivity range when the latch lever is in the on position and the latch is in the first position.

12. The circuit breaker of claim 11, further comprising a joint arm having a first end and a second end, the first end being rotatably coupled to the first rotational joint and the second end being coupled to a toggle, wherein the toggle is operably coupled to a switch.

13. The circuit breaker of claim 11, wherein the buckled shackle bends around the first rotational joint when the latch lever is in the on position such that at least a portion of the first rotational joint is located between the first end and the second end of the buckled shackle.

14. The circuit breaker of claim 11, wherein the change lever comprises a fixed rotational joint, and wherein the change lever is coupled to a coiled spring that applies a force on the change lever when the latch lever is in the on position.

15. The circuit breaker of claim 11, wherein the sensitivity range is between 6 Newtons and 8 Newtons.

16. The circuit breaker of claim 11, wherein the oblique angle between the first section and the second of the buckled shackle is between 150 degrees and 170 degrees.

17. The circuit breaker of claim 11, wherein the second extension comprises a trip component contact surface, and wherein a tripping force exerted by the trip component contact surface on the first extension of the latch needed to move the latch to initiate the trip response is approximately 1.4 Newtons.

18. The circuit breaker of claim 11, wherein:

the second extension of the latch comprises a thermal trip component contact surface, the latch further comprises a third extension, the third extension comprises a magnetic trip component contact surface, movement of a thermal trip component in contact with the thermal trip component contact surface causes the latch to pivot about an axis from a first position to a second position, and movement of a magnetic trip component in contact with the magnetic component contact surface causes the latch to pivot about the axis from the first position to the second position.

19. The circuit breaker of claim 11, further comprising:

a third rotational joint disposed in the change lever, wherein:

the second end of the buckled shackle is rotatably coupled to the third rotational joint, a line from a rotational center of the second rotational joint to a rotational center of the third rotational joint is aligned with the first rotational joint in a direction perpendicular to a rotational plane of the first rotational joint when the latch lever is in the on position.

20. The circuit breaker of claim 19, wherein when the latch lever is in the on position, no portion of the buckled shackle is aligned with the first rotational joint in a direction perpendicular to the rotational plane of the first rotational joint.

* * * * *